United States Patent [19]

McCall et al.

[11] Patent Number: 6,002,430
[45] Date of Patent: *Dec. 14, 1999

[54] METHOD AND APPARATUS FOR SIMULTANEOUS CAPTURE OF A SPHERICAL IMAGE

[75] Inventors: Danny A. McCall; H. Lee Martin, both of Knoxville, Tenn.

[73] Assignee: Interactive Pictures Corporation, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 08/863,584

[22] Filed: May 27, 1997

Related U.S. Application Data

[63] Continuation of application No. 08/494,599, Jun. 23, 1995, abandoned, which is a continuation-in-part of application No. 08/386,912, Feb. 8, 1995, abandoned, and application No. 08/373,446, Jan. 17, 1995, which is a continuation-in-part of application No. 08/189,585, Jan. 31, 1994, Pat. No. 5,384,588, said application No. 08/386,912, is a continuation of application No. 08/339,663, Nov. 11, 1994, abandoned, which is a continuation of application No. 08/189,585, which is a continuation-in-part of application No. 08/014,508, Feb. 8, 1993, Pat. No. 5,359,363, which is a continuation-in-part of application No. 07/699,366, May 13, 1991, Pat. No. 5,185,667.

[51] Int. Cl.$^6$ .................................................. H04H 5/30
[52] U.S. Cl. ..................... 348/207; 348/143; 348/335; 348/36; 382/293
[58] Field of Search ..................... 348/207, 222, 348/239, 36, 39, 47, 48, 143, 147, 37, 38; 382/268; 359/708, 718, 712, 725, 728, 364; 345/425, 427; H04N 5/30

[56] References Cited

U.S. PATENT DOCUMENTS

| | | |
|---|---|---|
| 4,152,724 | 5/1979 | Hunter . |
| 4,463,380 | 7/1984 | Hooks, Jr. . |
| 4,549,208 | 10/1985 | Kamejima et al. . |
| 4,613,898 | 9/1986 | Bagnall-Wild et al. ................. 358/87 |
| 4,672,435 | 6/1987 | Glück ....................................... 358/89 |
| 4,736,436 | 4/1988 | Yasukawa et al. . |
| 4,772,942 | 9/1988 | Tuck . |
| 4,807,158 | 2/1989 | Blanton et al. . |
| 4,858,149 | 8/1989 | Quarendon . |
| 4,899,293 | 2/1990 | Dawson et al. . |
| 4,965,844 | 10/1990 | Oka et al. . |
| 4,989,084 | 1/1991 | Wetzel ................................... 358/108 |
| 5,023,725 | 6/1991 | McCutchen . |
| 5,130,794 | 7/1992 | Ritchey ................................... 358/87 |
| 5,175,808 | 12/1992 | Sayre . |
| 5,185,667 | 2/1993 | Zimmermann .......................... 358/209 |
| 5,200,818 | 4/1993 | Neta et al. . |
| 5,359,363 | 10/1994 | Kcebah et al. ........................... 348/36 |
| 5,384,588 | 1/1995 | Martin et al. ........................... 348/15 |
| 5,396,583 | 3/1995 | Chen et al. . |
| 5,444,478 | 8/1995 | Lelong et al. ........................... 348/39 |

FOREIGN PATENT DOCUMENTS

WO 96/08105  3/1996  WIPO .

OTHER PUBLICATIONS

Science & Technology, Mar. 6, 1995, pp. 54–55, NASA's Tiny Camera Has A Wide–Angle Future, Larry Armstrong and Larry Holyoke.

*Primary Examiner*—Michael H. Lee
*Attorney, Agent, or Firm*—Banner & Witcoff, Ltd.

[57] ABSTRACT

A method and apparatus for capture of a spherical image is disclosed. The present invention includes at least one camera having a lens with at least a 180° field-of-view for capturing a hemispherical image. In a first embodiment, a second hemispherical image is created corresponding to a mirror image of the hemispherical image captured by the camera. In a second embodiment, two back-to-back cameras capture first and second hemispherical images, respectively. In both embodiments, a converter combines the two images along their outside edges to form a single, spherical image. Finally, the converter stores the complete spherical image for later retrieval and perspective corrected viewing.

18 Claims, 11 Drawing Sheets

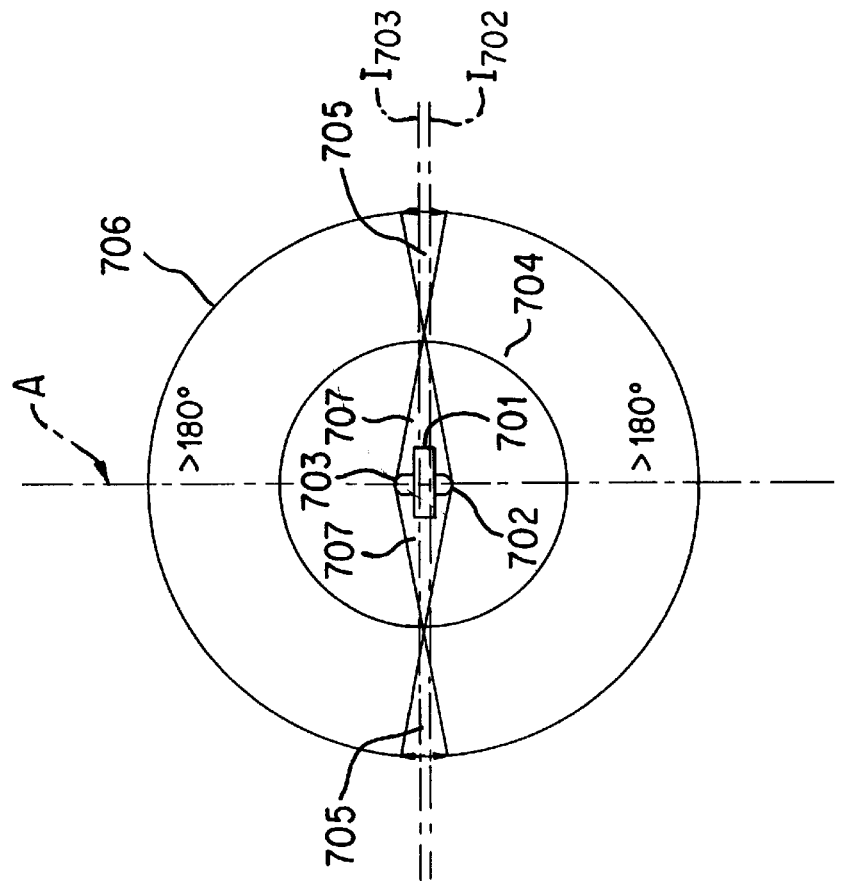
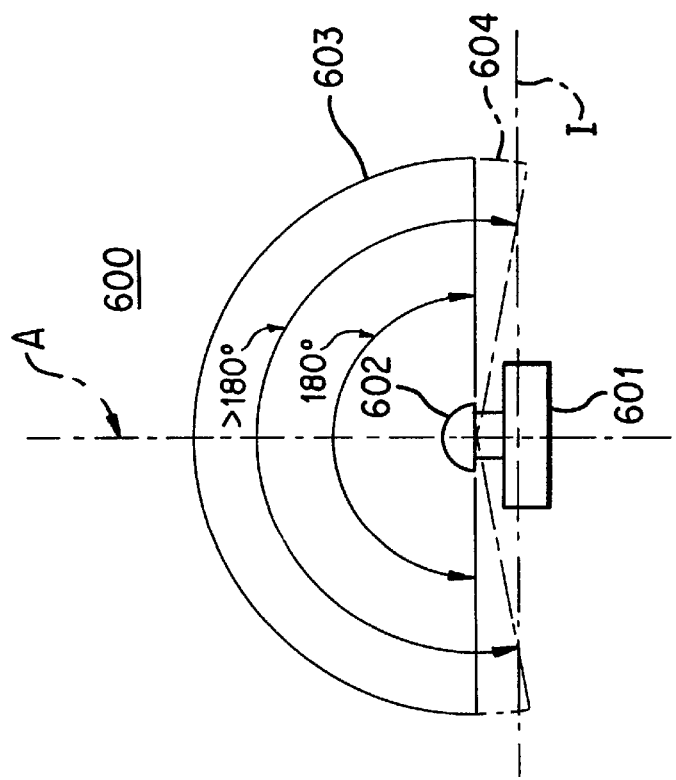
FIG. 2
FIG. 1

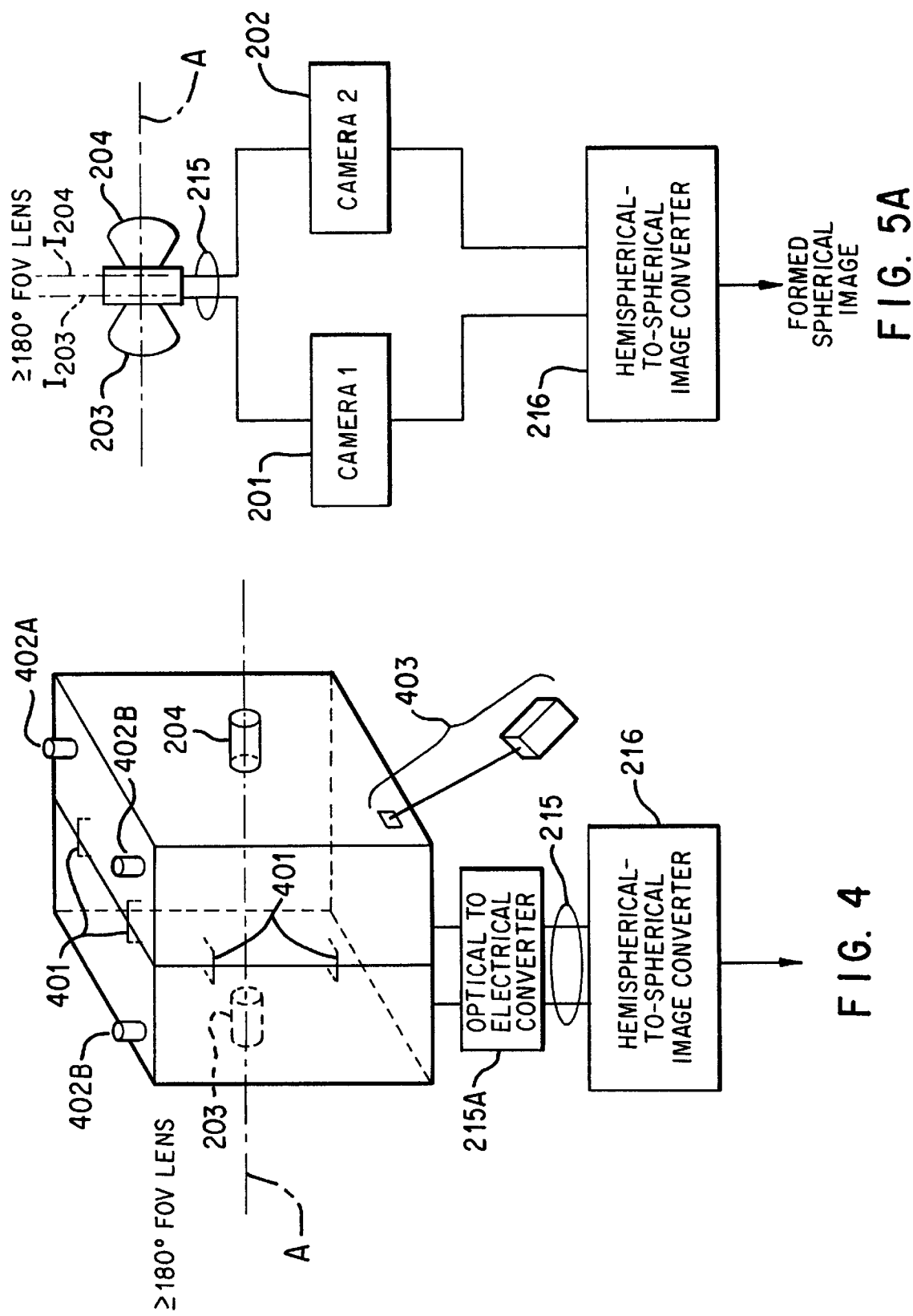

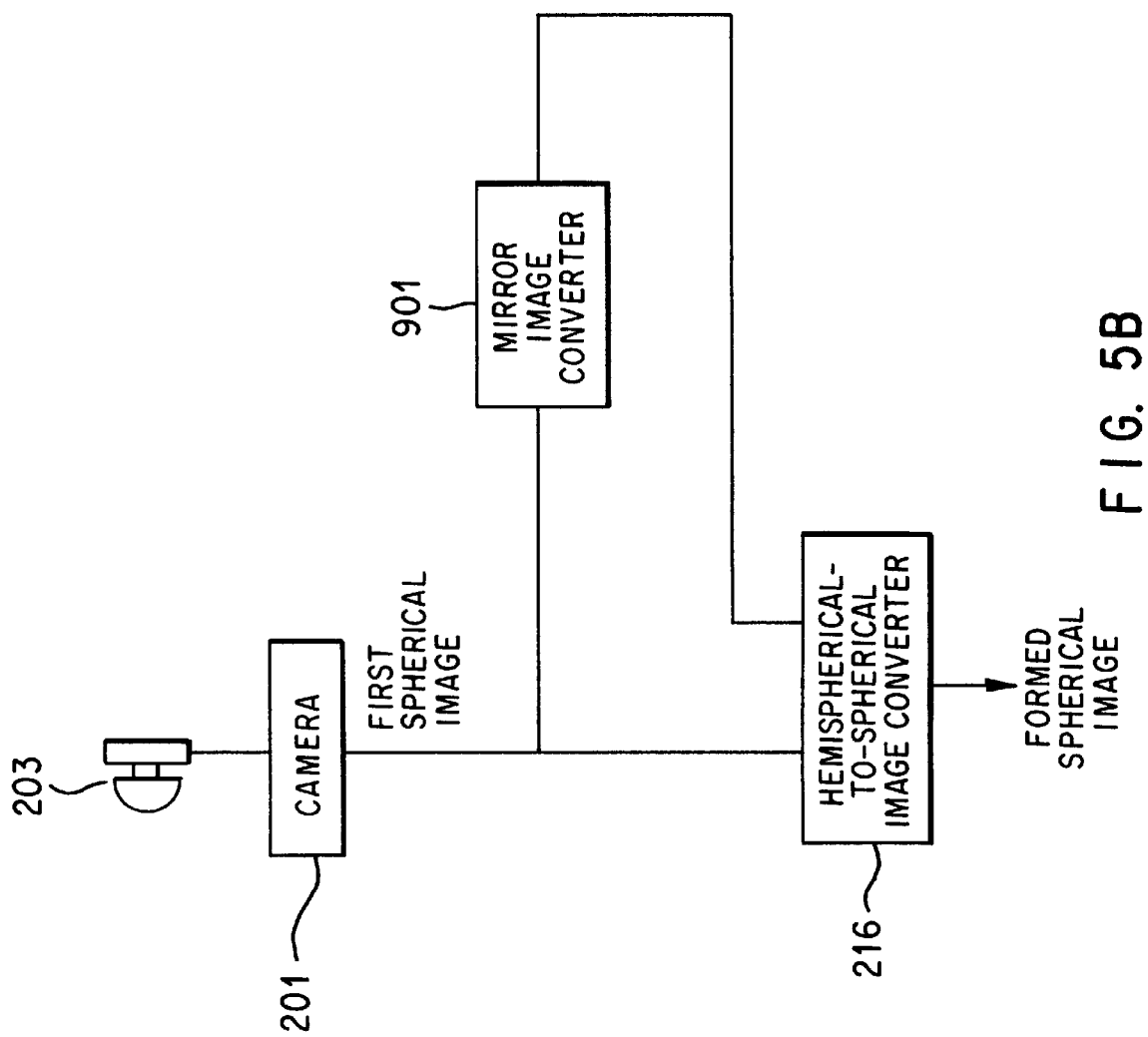

METHOD AND APPARATUS FOR SIMULTANEOUS CAPTURE OF A SPHERICAL IMAGE

The following U.S. patent applications and issued patents are hereby incorporated by reference: U.S. patent application Ser. No. 08/887,319 filed on Jul. 2, 1997; U.S. Pat. No. 5,877,801 issued Mar. 2, 1999, U.S. Pat. No. 5,384,588 issued on Jan. 24, 1995; U.S. Pat. No. 5,359,363 issued on Oct. 25, 1994; U.S. patent reissue No. RE36,207 issued on May 4, 1999; and U.S. paten application Ser. No. 08/373,446 filed on Jan. 17, 1995.

BACKGROUND OF THE INVENTION

1. Technical Field

This invention relates generally to an apparatus and method for capturing an image having a spherical field-of-view for subsequent viewing. Specifically, the present invention relates to a system involving a single camera having a lens with a field of view of at least 180° and associated method for capturing a first hemispherical image for subsequent combination into the spherical image. Alternatively, when the system comprises two cameras with such lenses mounted in a securely attached back-to-back arrangement, the system and method captures two distinct hemispherical images for subsequent combination into the spherical image. The preferred system includes a single-use, still image camera.

2. Background Art

The discussion of the background art related to the invention described herein relates to two subjects: spherical image capture and subsequent captured image transformations.

Spherical Image Capture

The goal of imaging technology is to make the observer feel as though he or she is part of the image. Prior art systems have partially accomplished this goal. Unfortunately, the ability of prior art systems to make the user feel part of the captured images are proportional to the cost of the image capture system.

Relating to inexpensive image capturing systems, camera companies have introduced disposable cameras. A disposable camera generally refers to a single-use camera that includes film, a lens, and a camera body, all in a single compact shell. The film includes either a single frame of film or multiple frames of film. After the entire roll of film has been exposed, the entire camera is returned for film developing. All the photographer receives back are the developed prints or slides. The manufacturer then recycles the parts from the returned camera, adds film, and ships the camera to a retailer for sale again. Disposable cameras come in various types including regular magnification cameras, telephoto cameras, water resistant cameras, and panoramic cameras.

Images captured by panoramic cameras provide wide angle horizontal images (left to right) but lack wide angle vertical images (up and down). Accordingly, while capturing a wide field-of-view on one plane (horizontal), the photographer loses the wide field-of-view on the other plane (vertical). Rotating the camera only alters the wide angle direction. The following example illustrates this shortcoming. Suppose a photographer desires to capture the grandeur of a dense forest from within the forest. While an image captured by a panoramic camera would include a sweeping cross section of trees (left to right), it would only include, at most, the middle portions of the nearest trees. To capture the forest floor and canopy, the photographer would have to take multiple panoramic photographs from looking almost straight down to looking straight up. The final image of the forest would then only be realized with the laborious task of manually cutting and pasting the different images together. Unfortunately, the left and right ends of the final image become distorted and cannot be easily resolved. The distortions created are similar to those encountered in map-making where one tries to represent a round earth on a flat map. Specifically, objects and relative distances near the extremes of the wide angle image become distorted. Additionally, this approach wastes film.

A slightly more complex panoramic camera employs a scanning drive mechanism which selectively exposes vertical strips of film as the camera scans from extreme to extreme. However, scanning panoramic cameras invariably introduce noise into captured images through vibrations generated from their scanning motions as well as take a relatively long period of time to capture the image.

Other wide-angle image capturing systems exist. For example, IMAX and 70 mm films provide high definition images on a large screen. However, these screens are flat. While a viewer can feel part of the scene when staring straight ahead, this feeling dissipates where the screen ends.

Another imaging system includes the OMNIMAX camera and projection system where an image was recorded and later projected on a spherical screen to produce an image 180 degrees wide, 100 degrees up from the horizon and 20 degrees below. While this system offers significant improvements over a flat screen projection system, the viewer's absorption into the displayed images is limited by the edges of the displayed image.

Another image capture and display system is U.S. Pat. No. 5,023,725 to McCutchen. McCutchen discloses a dodecahedral imaging system which breaks a sphere into 12 discrete polyhedrons. Each section has its own dedicated CCD camera. The images are captured and displayed on the walls of a hemispherical room. This system offers increased resolution through increasing the number of cameras used. However, as the number of cameras increase, the bulk of the imaging system likewise increases. Additionally, each camera has to be perfectly aligned with respect to the other cameras to adequately capture a spherical image. Using McCutcheon's system, increased resolution requires more bulk and more expense. Furthermore, the images of each camera are not integrated together. Accordingly, the system fails to account for the seams between the displayed images. While quickly moving images may mask these edge effects, the edge effects may be more noticeable with slow moving images.

Captured Image Transformations

Camera viewing systems are used in abundance for surveillance, inspection, security, and remote sensing. Remote viewing is critical, for example, for robotic manipulation tasks. Close viewing is necessary for detailed manipulation tasks while wide-angle viewing aids positioning of the robotic system to avoid collisions with the work space. Most of these systems use either a fixed-mount camera with a limited viewing field to reduce distortion, or they utilize mechanical pan-and-tilt platforms and mechanized zoom lenses to orient the camera and magnify its image. In the application where orientation of the camera and magnification of its image are required, the mechanical solution is large in size and can subtend a significant volume making the viewing system difficult to conceal or use in close quarters. Several cameras are usually necessary to provide wide-angle viewing of the work space.

In order to provide a maximum amount of viewing coverage or subtended angle, mechanical pan/tilt mechanisms usually use motorized drives and gear mechanisms to manipulate the vertical and horizontal orientation. An example of such a device is shown in U.S. Pat. No. 4,728, 839 issued to J. B. Coughlan, et al, on Mar. 1, 1988. Collisions with the working environment caused by these mechanical pan/tilt orientation mechanisms can damage both the camera and the work space and impede the remote handling operation. Simultaneously, viewing in said remote environments is extremely important to the performance of inspection and manipulation activities.

Camera viewing systems that use internal optics to provide wide viewing angles have also been developed in order to minimize the size and volume of the camera and the intrusion into the viewing area. These systems rely on the movement of either a mirror or prism to change the tilt-angle of orientation and provide mechanical rotation of the entire camera to change the pan angle of orientation. Additional lenses are used to minimize distortion. Using this means, the size of the camera orientation system can be minimized, but "blind spots" in the center of the view result. Also, these systems typically have no means of magnifying the image and or producing multiple images from a single camera.

Further, references that may be relevant to the evaluation of the captured image transformations as described herein include U.S. Pat. Nos. 4,772,942 issued to M. J. Tuck on Sep. 20, 1988; 5,067,019 issued to R. D. Juday on Nov. 19, 1991; and 5,068,735 issued to K. Tuchiya, et al on Nov. 26, 1991.

OBJECTS OF THE INVENTION

Accordingly, it is an object of the present invention to provide an apparatus that captures at least one hemispherical image for later manipulation.

Another object of the invention is to provide an apparatus which captures a spherical image from two images produced by two cameras.

Another object of the invention is to form a single spherical image from the captured image or images.

It is a further object of the invention to provide a spherical image capture system and method without the bulk of a large number of cameras and the necessity of multiple camera alignment.

Another object of the invention is to reduce the number of seams in a formed image.

Another object of the invention is to accomplish the above objectives using a single-use, disposable camera.

Another object of the invention is to provide a system for displaying a complete spherical image with perspective correction and without edge effects and image distortion.

Another object of the invention is to enable interaction with any portion of the spherical image with the selected portion being perspective corrected.

It is another object of the present invention to provide horizontal orientation (pan), vertical orientation (tilt) and rotational orientation (rotation) of the viewing direction with no moving mechanisms.

It is another object of the present invention to provide the ability to magnify or scale the image (zoom in and out) electronically.

It is another object of the present invention to provide electronic control of the image intensity (iris level).

It is another object of the present invention to be able to accomplish pan, tilt, zoom, rotation, and iris adjustment with simple inputs made by a lay person from a joystick, keyboard controller, or computer controlled means.

It is also an object of the present invention to provide accurate control of the absolute viewing direction and orientations using said input devices.

A further object of the present invention is to provide the ability to produce multiple images with different orientations and magnifications simultaneously from a single input image.

Another object of the present invention is to be able to provide these images at real-time video rate, e.g. thirty transformed images per second, and to support various display format standards such as the National Television Standards Committee RS-170 signal format and/or higher resolution formats currently under development and to provide the images to a computer display performing perspective correction transforms on a personal computer system.

It is also an object of the present invention to provide a system than can be used for automatic or manual surveillance of selected environments, with optical views of these environments corrected electronically to remove distortion so as to facilitate this surveillance.

It is another object of this invention to provide a means for directly addressing each picture element of an analog image captured with an imaging device having a field-of-view, the picture elements being addressed in a non-linear sequence determined in a manner similar to that described by U.S. Pat. No. 5,185,667 to provide a distortion-corrected image without requiring the use of filters and memory holding buffers.

Another object of the present invention is to provide a means for directly addressing each picture element of an image (still or video) captured using an imaging device having a two-dimensional field-of-view.

SUMMARY OF THE INVENTION

According to the principles of the present invention, at least one camera with a 180° or greater field-of-view lens captures a spherical image. When the system employs two cameras with such lenses, the cameras and lenses are mounted in a back-to-back arrangement. When used in this disclosure and attached claims, "back-to-back" means two cameras clasped together such that the image planes of the lenses fall between each of the lenses and both lenses' optical axes are collinear with a single line which passes through each lens and camera. An imaging element or elements capture the images produced by the lenses. When used herein and in the claims, an "imaging element" or "imaging elements" refer to both film and linear scanning devices and alternatives thereof upon which an image is focused and captured. The captured images from each camera are stored and combined to form a single, spherical image (a final, formed image). When used herein and in the claims, "stored" not only means to digitally store an image in a retrievable form but also means to capture the image on film. To form the spherical image, the system includes a converter which identifies, joins, and smooths the edges (also referred to as the "seams") of each hemispherical image. When used herein and in the claims, a "converter" refers to not only a manual system (splicing by hand and airbrush image altering techniques) but also an automatic image processing system (digital processing by a computer where images are altered automatically) for combining the two images together. Where a partial overlap exists between the two hemispherical images, the converter processes the partial overlap to remove the overlap and any distortion and create a single, complete, formed spherical image. Finally, a selected planar portion of the spherical image may be displayed on a personal computer using perspective correction software or hardware.

A method for capturing a spherical image includes the steps of capturing a first hemispherical image with a first camera including a first 180° or greater field-of-view lens; receiving a second hemispherical image either by capturing the second hemispherical image by means of a second camera including a second oppositely directed 180° or greater field-of-view lens or by creating a mirror image of the first hemispherical image; and, combining the first and second oppositely directed hemispherical images to create a spherical image.

An apparatus capturing a spherical image includes a first camera equipped with a 180° or greater field-of-view lens, the first camera and the lens directed in a first direction, the first camera capturing a first image; a second device either forming a second image corresponding to a mirror image of the first image or including a second camera equipped with a 180° or greater field-of-view lens, directed in a second direction opposite to the first direction, the second camera capturing the second image; and, a combining system for combining the first and second images into a formed spherical image.

The cameras disclosed above capture high resolution images. Various cameras may be used including still cameras, video cameras, and CCD, CID, or CMOS APS cameras. With high resolution (crystal clear) images as a goal, the system employs a still camera capturing a high resolution image on a fine grain film. Film generally composes a layer of silver halide crystals. Upon exposure to light, this silver halide layer picks up the image exposed to it. The greater the number of separate halide crystals, the greater the resolution of the film. Thus, a finer grain size refers to an increase in number of silver halide crystals per unit area of film which in turn refers to an increase in the potential resolution of the film medium.

When capturing a spherical image with two single-use cameras, the cameras include additional features allowing for dual image capture. Where "single-use camera" is referred to herein and in the claims, it refers to a disposable camera or other alternative. The additional features which aid in spherical image capture include attachment devices which attach the backs of the cameras to each other. When used herein, "attachment devices" refer to locking pins, locking clasps, lever and hook systems, and alternatives thereof. Also, each camera's shutter release may be controlled by a single button (common shutter release control) with either a mechanical or electrical servo linkage releasing each camera's shutter. Additionally, to allow a photographer to avoid his or her image from being captured by the spherical image capture system, the dual camera system includes a shutter auto timer or a remote shutter activation control controlling the common shutter release control. The remote shutter control may be an IR transmitter or remote shutter release cable. Further, the dual camera system may include two different shutters operable independently or sequentially. The sequential shutter operations allow the photographer to walk around to the other side of the dual camera system so as not to become part of the captured spherical image.

According to the present invention, when using a still image recorded on film, after developing the film, a high resolution digital scanner scans and digitizes the image contained in the developed film and stores the digitized image in a retrievable medium. The retrievable medium includes, inter alia, CD-ROMs, magnetic disks and tapes, semiconductor devices, and magneto-optical disks.

As referred to above, the second image may be created from the first image. This may be accomplished by at least one of two methods: first, manually, by forming the second image by hand and, second, automatically, by means of a computer running image processing software. As to manually creating the image, the film developing and printing steps generate the second image. For example, after printing or scanning the first hemispherical image, a technician or device flips or likewise reverses the film storing the at least hemispherical image (from left to right orientation to right to left orientation) and scans or prints the film again.

The automatic printing or scanning technique creates the second hemispherical image (also known as a mirror image of the first image) through appropriate software. Alternatively, image processing software or hardware may reverse the scanned image without the need to manually flip a developed piece of film.

The converter (automatic or manual) seams the two hemispherical images together and stores a generated, complete spherical image in a storage medium including CD-ROMs, magnetic disks and tapes, semiconductor devices and magneto-optical disks. This converting may be accomplished by sending the camera and/or film to a processing center which sends back the spherical image stored in one of the above storage mediums.

Finally, using the perspective correction and manipulation system as disclosed in U.S. Pat. No. 5,185,667 and its progeny including U.S. Pat. Nos. 5,359,363 and 5,313,306 and Serial Nos. 08/189,585, 08/339,663, and 08/373,446, the formed, seamless, spherical image may be explored. These patents and applications and others herein are expressly incorporated by reference.

Preferably, a personal computer system runs the perspective correction software or hardware. These computers may be directly linked to the image capturing system (allowing viewing of the spherical image as captured by the hemispherical camera or cameras and manipulated by the perspective correction system) or may remain completely separate (photographing an image, sending the film to a processing center which creates a spherical image from the photograph or photographs, and returning the spherical image stored in a retrievable form for display on a personal computer).

BRIEF DESCRIPTION OF THE DRAWINGS

The above mentioned features of the invention will become more clearly understood from the following detailed description of the invention read together with the drawings in which:

FIG. 1 is a diagram of the fields of view for 180° and greater than 180° fields of view lenses as mounted to a single camera body.

FIG. 2 shows two back-to-back cameras each capturing more than 180° fields of view images.

FIG. 4 shows an alternative embodiment of the spherical capture system of the present invention.

FIGS. 5A and 5B relate to the elements used to capture a spherical image. FIG. 5A shows two hemispherical lenses capturing complementary hemispherical images and feeding them to remote cameras. FIG. 5B shows a hemispherical lens capturing a hemispherical image and a mirror image converter for converting the first hemispherical image into a second hemispherical image.

FIG. 9A shows the perspective correction process implemented in hardware. FIG. 9B shows the perspective correction process implemented in software, operating inside a personal computer.

DETAILED DESCRIPTION OF THE INVENTION

Spherical Image Capture

Figure 3:
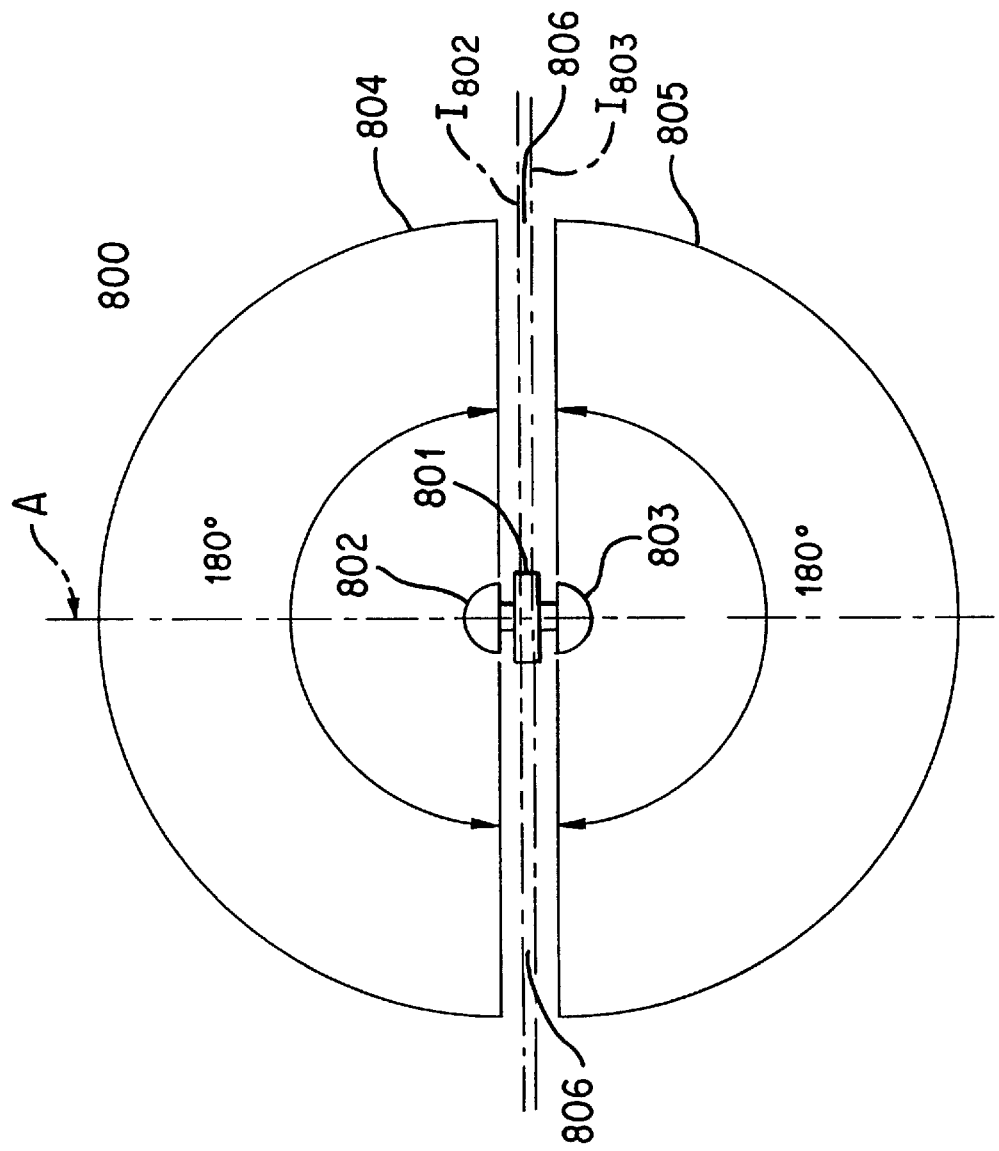
FIG. 3 shows two back-to-back cameras each capturing 180° fields of view images.

The disclosed Spherical Image Capture system employs the components disclosed in FIGS. 1–8 to capture hemispherical images and form spherical images. The image transform engine as disclosed in FIGS. 9–13 operates to transform selected portions of the formed spherical images into planar, perspective corrected portions.

Referring to FIG. 1, camera 601 includes lens 602 with optical axis A, image plane I, and a field-of-view of 180° or greater. If lens 602 has a 180° field-of-view it captures at most the image from hemisphere 603. On the other hand, if lens 602 has a field-of-view greater than 180°, then it captures the image from sector 604 (shown by dotted lines) as well as that of hemisphere 603.

FIG. 2 shows a camera body 701 (which may include two cameras) connected to lenses 702 and 703 (with image planes $I_{702}$ and $I_{703}$, respectively). Each of lenses 702 and 703 have fields of view greater than 180°. Placed in a back-to-back arrangement where the lenses are mounted such that the image planes $I_{702}$ and $I_{703}$ from the lenses fall between each of the lenses and both lenses' optical axes A coincide in a single line which passes through each lens and camera, they capture the spherical image surrounding the camera body 701. It should be noted, however, that the thickness of the camera body 701 plays a role in how much of the spherical image surrounding the camera is captured. Specifically, the objects on the sides of the camera may or may not be completely photographed depending on their distances from the camera body 701. For example, if objects are within boundary 704, some of the objects may fall into the camera's blind spots 707 and not be completely photographed. On the other hand, because of the converging angles of lenses' greater than 180° fields of view, objects within sectors 705 will be photographed twice: first, by means of the image captured by lens 702 and, second, by means of the image captured by lens 703. Decreasing the distances between the lenses reduces blind spots 707 of the spherical capture system. In this example, reducing the distance between the lenses means reducing the thickness of the camera body 701. Reducing the camera body thickness can be accomplished, for example, by using smaller imaging and recording elements such as a CCD, CID, or CMOS APS camera as disclosed in U.S. Ser. No. 08/373,446, expressly incorporated herein by reference. Additionally, the distance between image planes $I_{702}$ and $I_{703}$ of lenses 702 and 703, respectively, may be reduced to the point where the image planes coincide, further reducing the thickness of the camera body.

FIG. 3 discloses camera body 801, similar to that of camera body 701, and lenses 802 and 803 with image planes $I_{802}$ and $I_{803}$, respectively, each having a field-of-view of exactly 180°. Lens 802 receives the image of hemisphere 804 and lens 803 receives the image of hemisphere 805. Similar to FIG. 2 above, the lenses attach to camera body 801 in a back-to-back arrangement where the lenses are mounted such that the image planes $I_{802}$ and $I_{803}$ from the lenses fall between each of the lenses and both lenses' optical axes A coincide in a single line which passes through each lens and camera. As discussed with reference to FIG. 2 above, because camera body 801 has a thickness (i.e., the distance between lenses 802 and 803 is greater than zero), the image capture system 800 has blind spots 806 on the sides of the camera body 801. These blind spots may be reduced by decreasing the distance between lenses 802 and 803. Here, this means reducing the thickness of camera body 801. This may be accomplished, inter alia, by reducing the size of the imaging and recording components as discussed above in reference to FIG. 2.

Referring now to FIG. 5a, two cameras 201 and 202 equipped with lenses 203, 204, each having a field-of-view (FOV) greater than 180°, are disclosed in a back-to-back arrangement (the image planes (not shown) falling between each of the lenses and the optical axes of the lenses 203 and 204 are collinear as designated by line A). Because each camera 201, 202 has a lens (203, 204) which has a field-of-view (FOV) greater than 180°, each captures more than the image of a complete hemisphere. By employing two cameras in this arrangement, the camera system captures a complete spherical image. The types of cameras employed are chosen from the group comprising of at least still cameras with loaded film or digital image capture, motion picture cameras with loaded film or digital image capture, the KODAK™ digital image capture system, video, and linear scanning CID, CCD, or CMOS APS camera arrays. The outputs of cameras 201 and 202 connect by means of electrical, optical, or electro-optical links 215 to hemispherical-to-spherical image converter 216. When the captured hemispherical images are stored on film, optical-to-electrical converter 215A converts the stored images into a form usable by hemispherical-to-spherical image converter 216. Optical-to-electrical converter 215A includes a scanning system which scans a photographed image and outputs a high resolution, electronic replica of the photographed image. One converter includes the Kodak™ Photo-CD Rom converter which takes a photograph and converts it into a high resolution digital form which then may be stored on a compact disk. Hemispherical-to-spherical converter 216 receives the hemispherical images from cameras 201 and 202 (or alternatively, from optical-to-electrical converter 215A).

The cameras include additional features allowing for dual image capture. For example, referring to FIG. 4 the backs of the cameras are attached to each other via separable attachment devices 401. Attachment devices 401 may be locking pins, locking clasps, lever and clip systems, etc. Also, each camera's shutter release may be controlled by a single button 402 A (common shutter release control) with either a mechanical or electrical servo linkage releasing each camera's shutter. Additionally, to allow a photographer to ensure his or her image is not recorded by the spherical image capture system, the dual camera system includes a shutter auto timer or a remote shutter activation control 403 controlling the common shutter release control, allowing the photographer to move to a concealed or non-image-captured position. The remote shutter control 403 may be an IR transmitter or remote shutter release cable. Further, the dual camera system may include two different shutters release control buttons 402B operable independently or sequentially. The sequential shutter operations allow the photographer to walk around to the other side of the dual camera system so as not to become part of the captured spherical image.

Next, hemispherical-to-spherical converter 216 combines the hemispherical images into a single, complete spherical image. Finally, the edges of the two hemispherical images may be combined to form a seamless spherical image. Removing the seams from the two hemispherical images may be accomplished in a number of ways. For example, the two images may be "airbrushed" together (where any difference between the two images at the periphery of the images are smoothed together. Alternatively, a more complex method of seaming the two images together may include matching related pixels by their luminance and chrominance values and interpolating the corresponding values for interstitial pixels. In the event that a partial overlap exists between the two hemispherical images, the converter processes the spherical image to remove the partial overlap any distortion and creates a single, complete, formed image. The processing may include choosing and displaying one hemisphere over the other, weighted and non-weighted averaging of the overlapping sections, and linear and non-linear approximations creating intermediary images.

FIG. 5A shows lenses 203 and 204 positioned remotely from cameras 201 and 202. Here, the image planes $I_{203}$ and $I_{204}$ fall between lenses 203 and 204 and the optical axes of the lenses 203 and 204 are collinear as designated by line A. Electrical, optical (including fiber optic lines), or electro-optical links 215 connect the images received from lenses 203 and 204 to the cameras 201 and 202. Next, hemispherical-to-spherical image converter 216 receives the outputs from cameras 201 and 202 and outputs a spherical image as described in relation to FIG. 4.

FIG. 5B shows single lens 203 positioned remotely from camera 201. Electrical, optical (including fiber optic lines), or electro-optical links 215 connect the image received from lens 203 to the camera 201. Next, camera 201 captures a first hemispherical image. The output of camera 201 (a still or video image contained in a frame or frames of film, digital or analog signal) is sent to mirror image converter 901 and one input of the hemispherical to spherical image converter 216. The mirror image converter 901 assumes many forms depending on the form of image relayed to it. For developed film, converter 901 refers to a re-scanning system re-scanning the developed film with the film flipped (flipped from a left to right orientation to a right to left orientation). For an optical or electrical signal, converter 901 refers to a signal processing system which automatically creates a second hemispherical image from the first hemispherical image. The output of converter 901 flows to the hemispherical-to-spherical image converter 216 as the second hemispherical image. Finally, hemispherical-to-spherical image converter 216 outputs a spherical image as described in relation to FIG. 4.

Figure 6A:
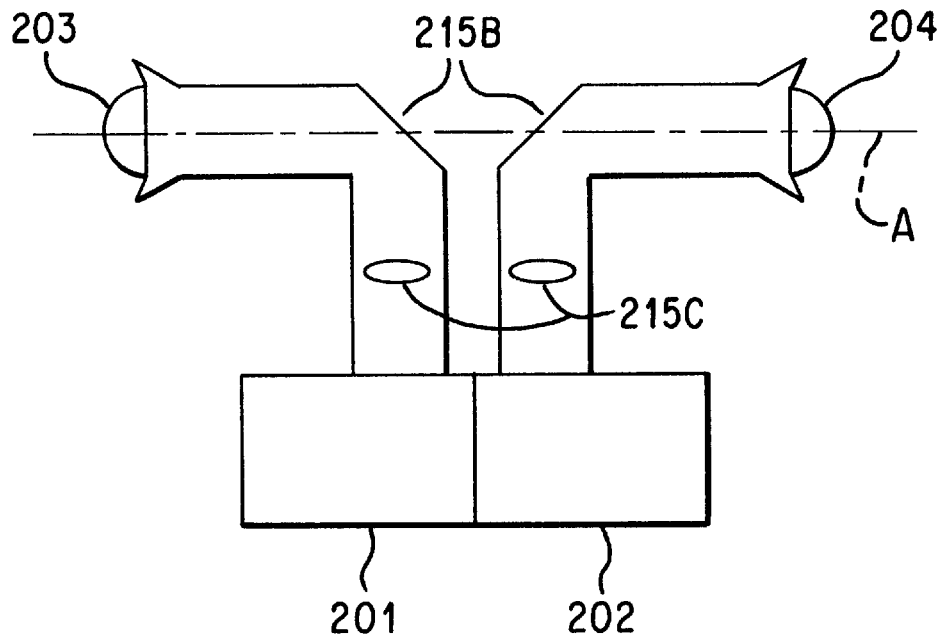
FIG. 6A shows two hemispherical lenses similar to that of FIG. 5A passing images to local cameras through reflective and refractive optics.

FIG. 6A shows an alternative arrangement of the cameras 201 and 202 and the lenses 203 and 204. The optical axes of the lenses 203 and 204 are collinear as designated by line A. Here, the devices used to convey the images from lenses 203 and 204 to cameras 201 and 202 include hollow chambers with reflective optics 215B and refractive optics 215C, as necessary for proper transmission of the hemispherical images. The reflective optics 215B allow the cameras 201 and 202 to be moved from a location directly behind each lens 203, 204. The refractive optics 215C aid in focusing the hemispherical images generated by lenses 203 and 204. This movement of the cameras from behind the lenses allows the lenses to be moved closer together, maximizing the area photographed.

A further modification includes the substitution of the APS camera array of co-pending U.S. application Ser. No. 08/373,446 (expressly incorporated herein by reference) for the optical system described above. Because of the small size of an APS camera array, two arrays may be placed back to back to further maximize the content of each hemispherical image. An advantage of using APS camera arrays is the shifted processing location of the Omniview engine. Specifically, by adding additional processing circuitry on the APS camera array chip, the selection and "dewarping" transformations may be performed locally on the APS chip. This results in less subsequent processing of the image as well as a reduction in the bandwidth required for sending each hemispherical image to an external processing device.

Furthermore, as described above, image conduits 215 may include optical fibers instead of the reflective optics 215B and refractive optics 215C. An imaging system including optical fibers connected between a hemispherical lens and imaging array is found in U.S. Pat. No. 5,313,306 to Martin which is expressly incorporated by reference. The present invention includes the application of the spherical imaging system with a combination of an endoscope and dual hemispherical lenses to capture hemispherical images of remote locations. Converter 216 combines the hemispherical images to form a complete, spherical image.

Figure 6B:
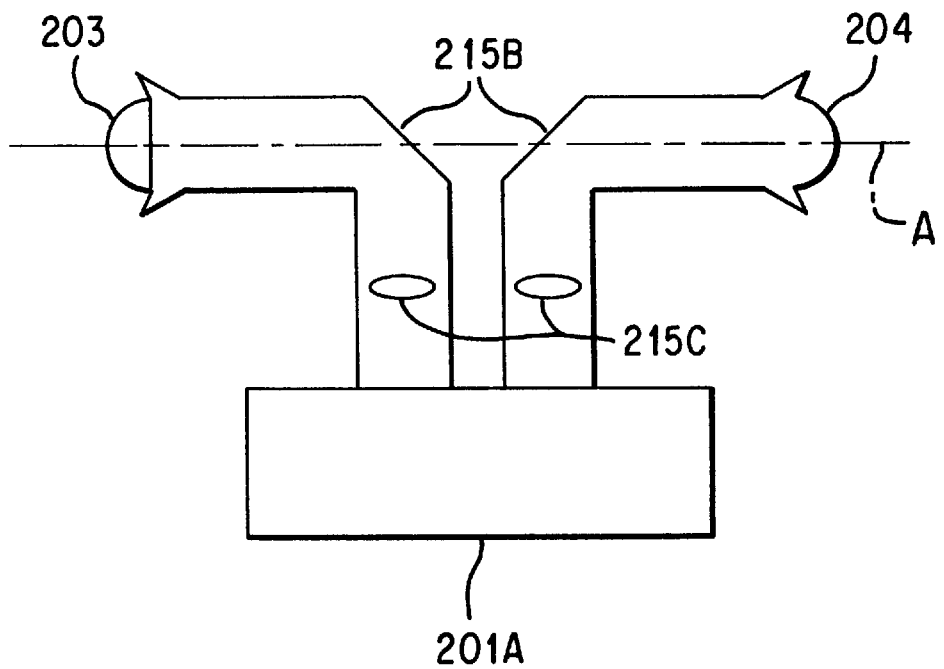
FIG. 6B shows two hemispherical lenses conveying images to a single camera.
Figure 7A:
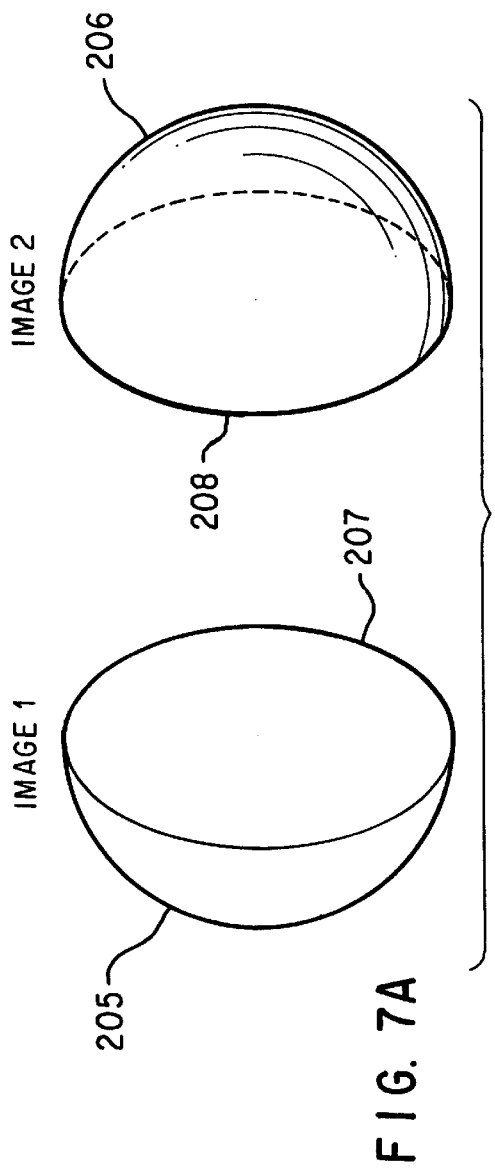
FIGS. 7A and 7B represent two hemispherical images combined into a single spherical image.
Figure 7B:
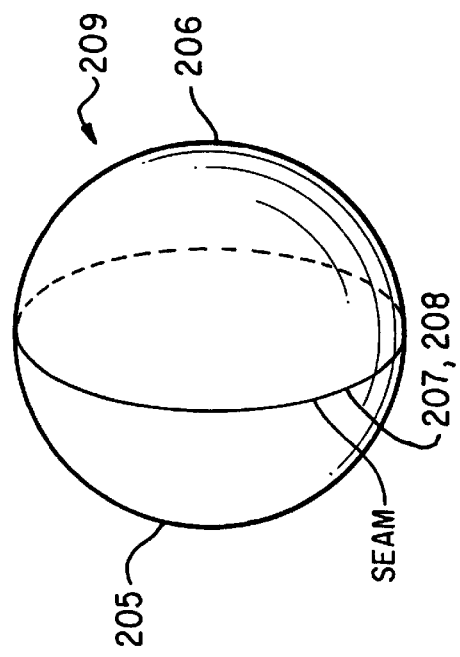

FIG. 6B relates to another embodiment where a single camera 201A captures the images produced by lenses 203 and 204. The optical axes of the lenses 203 and 204 are collinear as designated by line A. Here, employing a single camera to capture both hemispherical images (from lenses 203 and 204) eliminates the bulk of the second camera. For example, where camera 201A is a still camera, the camera records the two hemispherical images in a single frame in a side-by-side relationship, exposed at the same time or during related time intervals. Alternatively, the two images may be captured in separate frames, exposed at the same time or during related time intervals. The same applies to video and motion picture cameras as well. Image capture with a single camera may be used in the other embodiments of described in greater detail herein. A system of FIG. 6B including an APS camera array may be mounted onto a single, silicon chip. This combination has multiple advantages including reduced size of the image capture system, reduced bulk from extra cameras, higher resolution from the APS camera arrays, FIG. 7A shows first 205 and second 206 hemispherical images, each taken from one of cameras 201 or 202. FIG. 7A also shows the edges 207, 208 (or seams) of each hemispherical image. FIG. 7B shows the two images 205 and 206 combined into a single, spherical image 209. Seams 207 and 208 have been combined to form the single, seamless image 209.

Figure 8:
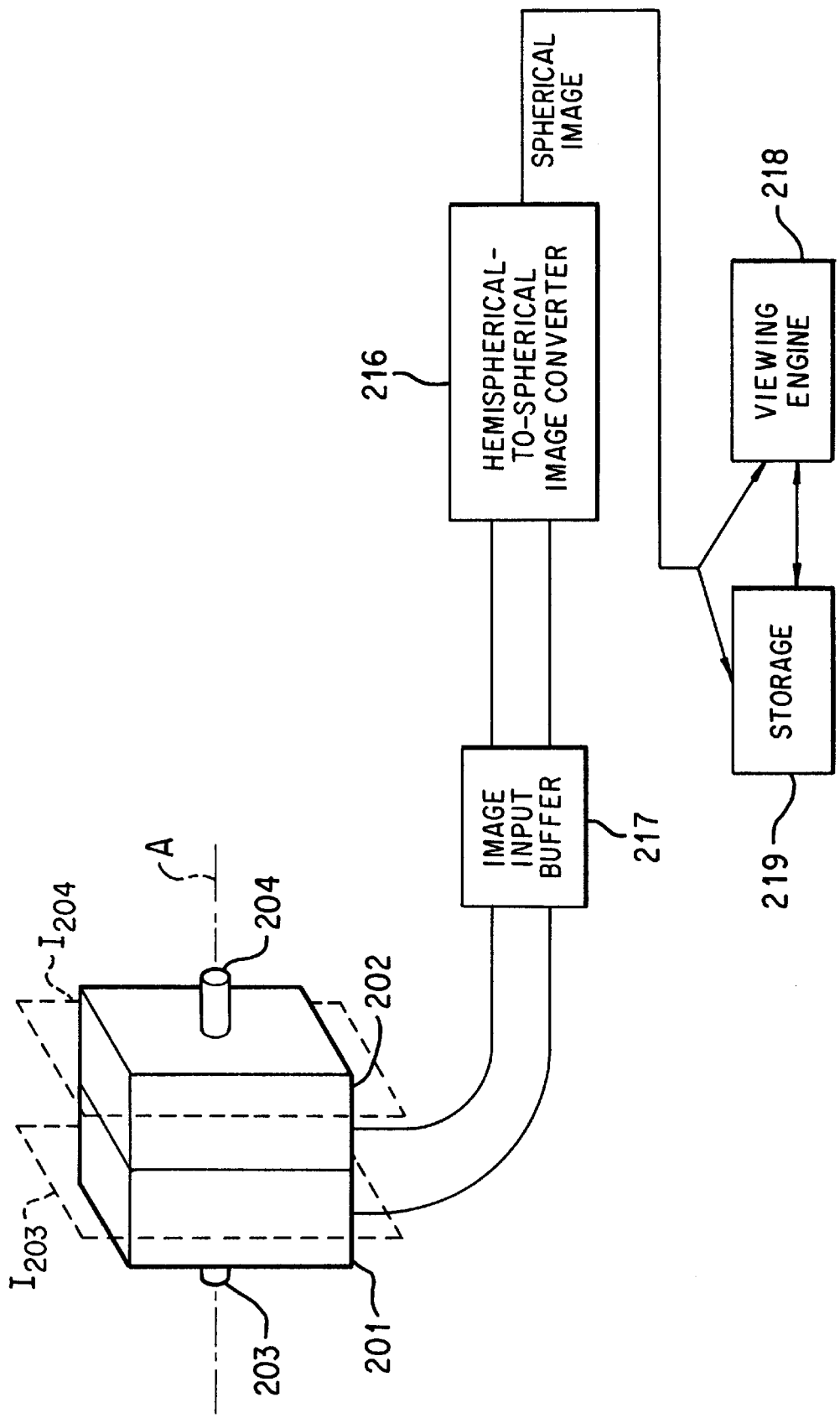
FIG. 8 shows a storage/display option of the instant invention.

FIG. 8 shows a possible future viewing system for viewing the formed spherical image system. The image planes $I_{203}$ and $I_{204}$ fall between lenses 203 and 204 and the optical axes of the lenses 203 and 204 are collinear as designated by line A. Image input buffer 217 temporarily stores images received from cameras 201 and 202 until hemispherical-to-spherical image converter 216 accepts the stored images. Also, FIG. 8 includes options for the spherical images. For example, after combining the two hemispherical images into a single, spherical image in converter 216, the spherical image may be immediately viewed through viewing engine 218. Viewing engine 218 includes the Omniview calculation engine with viewer communication interface 124 as shown in FIG. 1 of co-pending U.S. Ser. No. 08/373,446 (expressly incorporated herein by reference). Here, the user may view selected portions of the formed spherical image as output from the hemispherical-to-spherical image converter 216. Alternatively, the spherical image may be stored in storage device 219. The storage device 119 may include video tape, CD-ROM, semiconductor devices, magnetic or magneto-optical disks, or laser disks as the storage medium. By the interconnections between viewing engine 218 and storage device 219, a new spherical image may be displayed and saved in storage device 219 as well as saved in storage device 219 and viewed at a later time.

Further enhancements include using two side-by-side hemispherical lens equipped cameras for stereo-optical viewing. Additionally, the back-to-back camera system described herein may be attached to the exterior of any of a number of different vehicles for spherical image capture of a number of different environments.

Captured Image Transformation

FIGS. 9–13 relate to the captured image transformation system.

In order to minimize the size of the camera orientation system while maintaining the ability to zoom, a camera orientation system that utilizes electronic image transformation rather than mechanisms was developed. While numerous patents on mechanical pan-and-tilt systems have been filed, no approach using strictly electronic transforms and 180° or greater field of view optics is known to have been successfully implemented. In addition, the electro-optical approach utilized in the present invention allows multiple images to be extracted from the output of a signaled camera. These images can be then utilized to energize appropriate alarms, for example, as a specific application of the basic image transformation in connection with a surveillance system. As utilized herein, the term "surveillance" has a wide range including, but not limited to, determining ingress or egress from a selected environment. Further, the term "wide angle" as used herein means a field-of-view of about eighty degrees or greater. Motivation for this device came from viewing system requirements in remote handling applications where the operating envelop of the equipment is a significant constraint to task accomplishment.

Figure 9A:
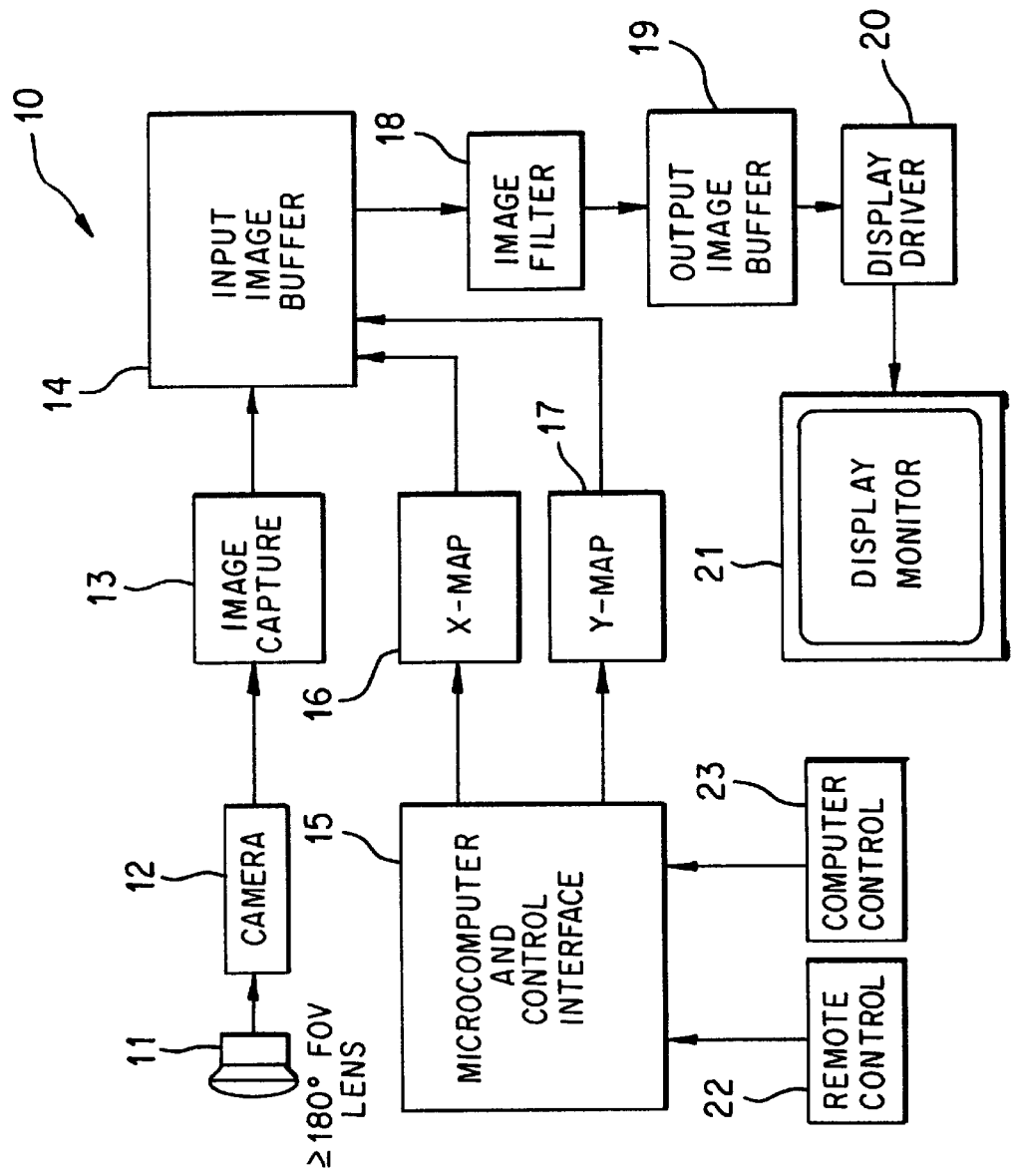
FIGS. 9A and 9B show a schematic block diagram of the signal processing portion of the present invention illustrating the major components thereof.
Figure 9B:
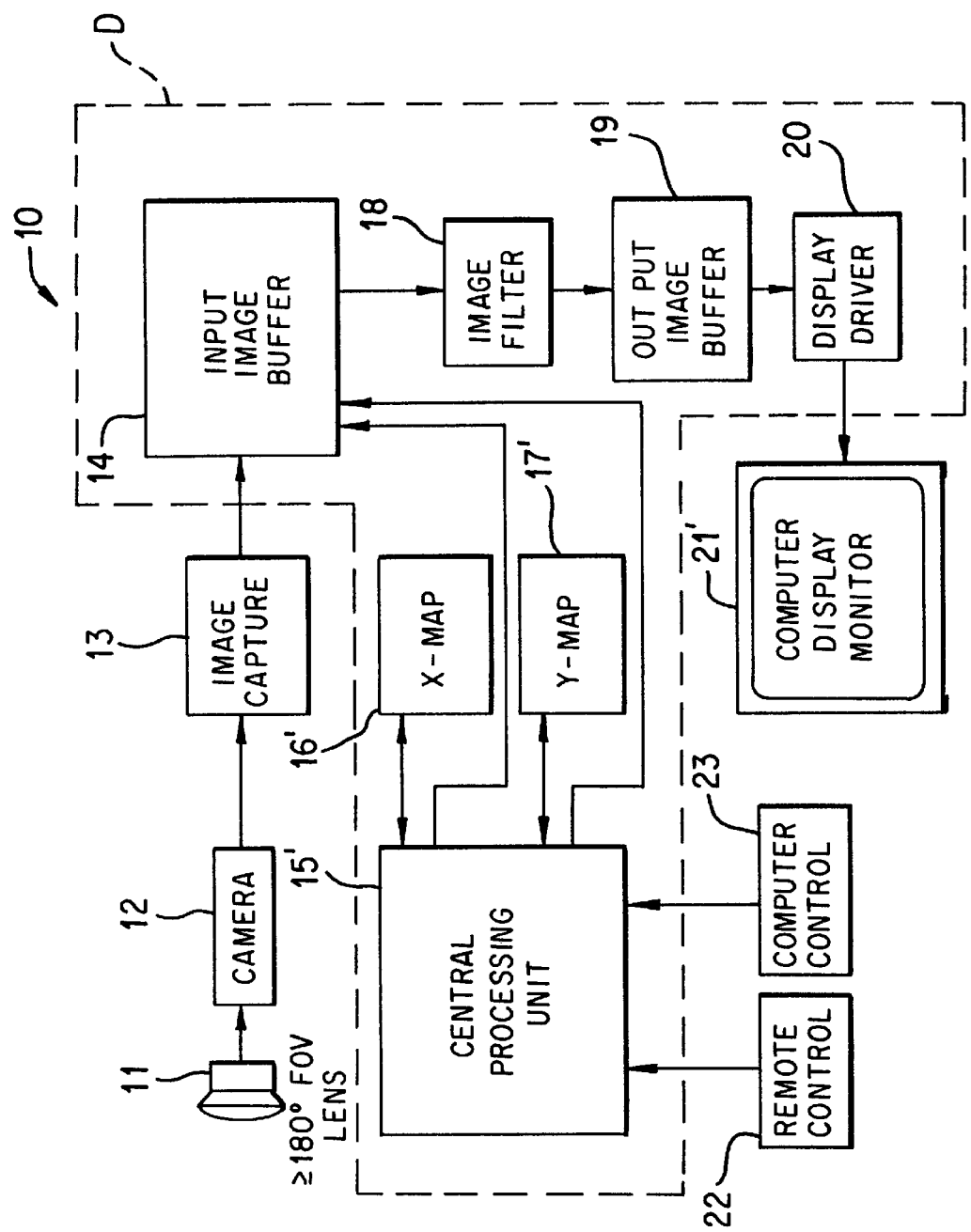
Figure 11:
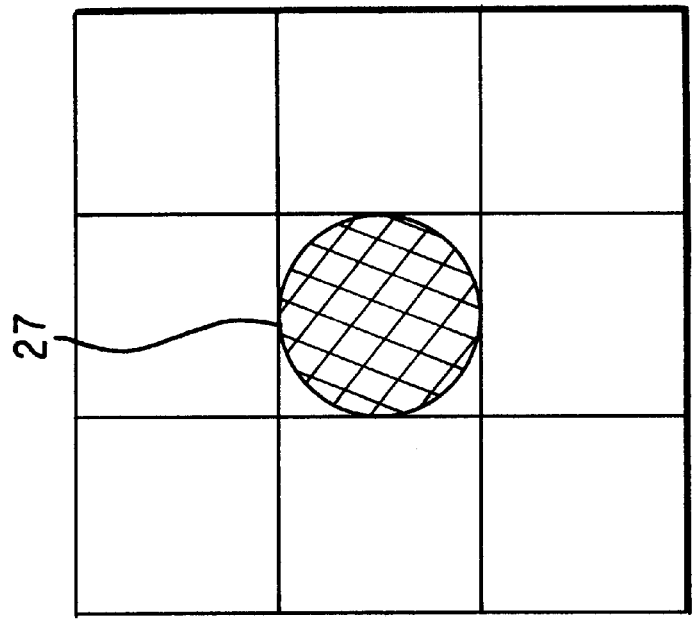
FIG. 11 is an exemplary drawing of the output image after correction for a desired image or orientation and magnification within the original image.

The principles of the optical transform utilized in the present invention can be understood by reference to the system 10 of FIGS. 9A and 9B. (This is also set forth in the aforecited U.S. patent reissue Ser. No. RE36,207 that is incorporated herein by reference.) Referring to FIG. 9A, shown schematically at 11 is a wide angle, e.g., a hemispherical, lens that provides an image of the environment with a 180 degree or greater field-of-view. The lens is attached to a camera 12 which converts the optical image into an electrical signal. These signals are then digitized electronically 13 and stored in an image buffer 14 within the present invention. An image processing system consisting of an X-MAP and a Y-MAP processor shown as 16 and 17, respectively, performs the two-dimensional transform mapping. The image transform processors are controlled by the microcomputer and control interface 15. The microcomputer control interface provides initialization and transform parameter calculation for the system. The control interface also determines the desired transformation coefficients based on orientation angle, magnification, rotation, and light sensitivity input from an input means such as a joystick controller 22 or computer input means 23. The transformed image is filtered by a 2-dimensional convolution filter 18 and the output of the filtered image is stored in an output image buffer 19. The output image buffer 19 is scanned out by display electronics 20 to a video display device 21 for viewing.

A range of lens types can be accommodated to support various fields of view. The lens optics 11 correspond directly with the mathematical coefficients used with the X-MAP and Y-MAP processors 16 and 17 to transform the image. The capability to pan and tilt the output image remains even though a different maximum field-of-view is provided with a different lens element.

The invention can be realized by proper combination of a number of optical and electronic devices. The lens 11 is exemplified by any of a series of wide angle lenses from, for example, Nikon, particularly the 8mm F2.8. Any video source 12 and image capturing device 13 that converts the optical image into electronic memory can serve as the input for the invention such as a Videk Digital Camera interfaced with Texas Instrument's TMS 34061 integrated circuits. Input and output image buffers 14 and 19 can be construed using Texas Instrument TMS44C251 video random access memory chips or their equivalents. The control interface can be accomplished with any of a number of microcontrollers including the Intel 80C196. The X-MAP and Y-MAP transform processors 16 and 17 and image filtering 19 can be accomplished with application specific integrated circuits or other means as will be known to persons skilled in the art. The display driver can also be accomplished with integrated circuits such as the Texas Instruments TMS34061. The output video signal can be of the NTSC RS-170, for example, compatible with most commercial television displays in the United States. Remote control 22 and computer control 23 are accomplished via readily available switches and/or computer systems than also will be well known. These components function as a system to select a portion of the input image (hemispherical or other wide angle) and then mathematically transform the image to provide the proper perspective for output. The keys to the success of the perspective correction system include:

(1) the entire input image need not be transformed, only the portion of interest;

(2) the required mathematical transform is predictable based on the lens characteristics; and (3) calibration coefficients can be modified by the end user to correct for any lens/camera combination supporting both new and retrofit applications.

FIG. 9B contains elements similar to that of FIG. 9A but is implemented in a personal computer represented by dashed line D. The personal computer includes central processing unit 15' performing the perspective correction algorithms X-MAP 16' and Y-MAP 17' as stored in RAM, ROM, or some other form. The display driver 20 outputs the perspective corrected image to computer display monitor 21'.

Figure 10:
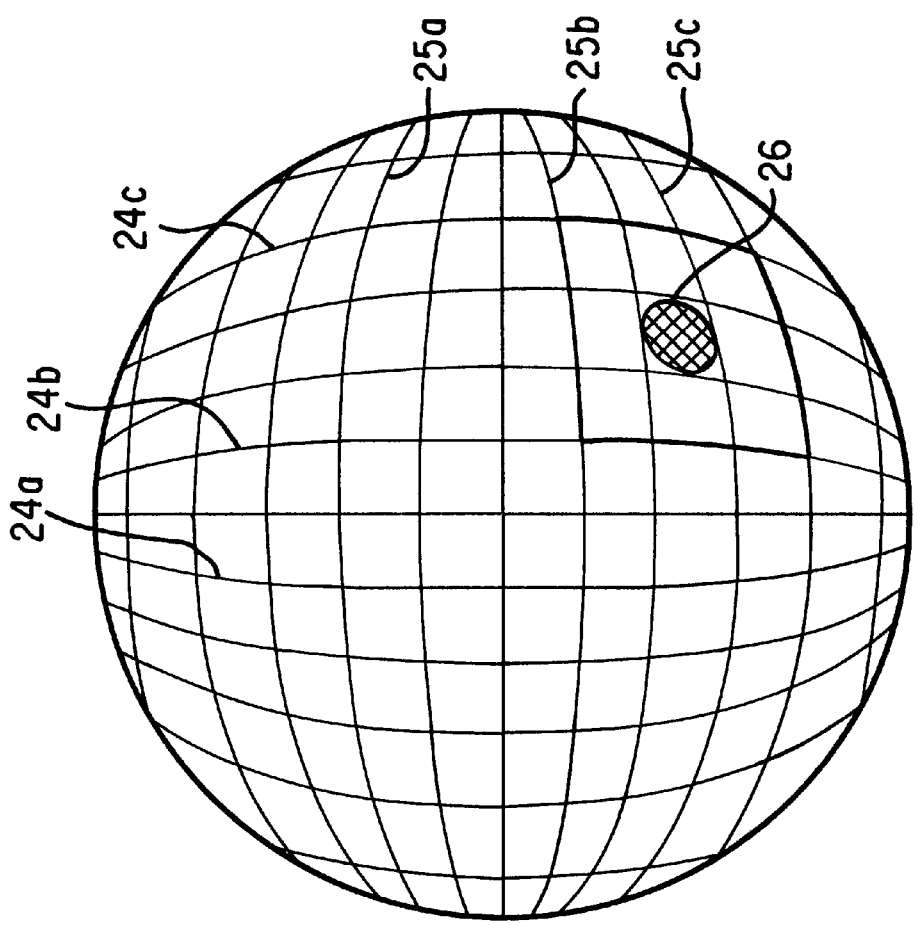
FIG. 10 is an exemplary drawing of an at least hemispherical image used as input by the present invention. Lenses having other field-of-view values will produce images with similar distortion, particularly when the field-of-view is about eighty degrees or greater.

The transformation that occurs between the input memory buffer 14 and the output memory buffer 19, as controlled by the two coordinated buffer 19, as controlled by the two coordinated transformation circuits 16 and 17 of FIG. 9A (or algorithms as stored in 16' and 17' of FIG. 9B), is better understood by referring to FIGS. 10 is a rendering of the image of a grid pattern produced by a hemispherical lens. This image has a field-of-view of 180 degrees and shows the contents of the environment throughout and entire hemisphere. Notice that the resulting image in FIG. 10 is significantly distorted relative to human perception. Similar distortion will be obtained even with lesser field-of-view lenses. Vertical grid lines in the environment appear in the image plane as 24a, 24b, and 24c. Horizontal grid lines in the environment appear in the image plane as 25a, 25b, and 25c. The image of an object is exemplified by 26. A portion of the image in FIG. 10 has been corrected, magnified, and rotated to produce the image shown in FIG. 11. Item 27 shows the corrected representation of the object in the output display. The results shown in the image in FIG. 11 can be produced from any portion of the image of FIG. 10 using the present invention. The corrected perspective of the view is demonstrated by the straightening of the grid pattern displayed in FIG. 11. In the present invention, these transformations can be performed at real-time video rates (e.g., thirty times per second), compatible with commercial video standards.

The transformation portion of the invention as described has the capability to pan and tilt the output image through the entire field-of-view of the lens element by changing the input means, e.g. the joystick or computer, to the controller. This allows a large area to be scanned for information as can be useful in security and surveillance applications. The image can also be rotated through any portion of 360 degrees on its axis changing the perceived vertical of the displayed image. This capability provides the ability to align the vertical image with the gravity vector to maintain a proper perspective in the image display regardless of the pan or tilt angle of the image. The invention also supports modifications in the magnification used to display the output image. This is commensurate with a zoom function that allows a change in the field-of-view of the output image. This function is extremely useful for inspection and surveillance operations. The magnitude of zoom provided is a function of the resolution of the input camera, the resolution of the output display, the clarity of the output display, and the amount of picture element (pixel) averaging that is used in a given display. The invention supports all of these functions to provide capabilities associated with traditional mechanical pan (through 180 degrees), tilt (through 180 degrees), rotation (through 360 degrees), and zoom devices. The digital system also supports image intensity scaling that emulates the functionality of a mechanical iris by shifting the intensity of the displayed image based on commands from the user or an external computer.

The postulates and equations that follow are based on the image transformation portion of the present invention utilizing a wide angle lens as the optical element. These also apply to other field-of-view lens systems. There are two basic properties and two basic postulates that describe the perfect wide angle lens system. The first property of such a lens is that the lens has a $2\pi$ ateradian field-of-view and the image it produces is a circle. The second property is that all objects in the field-of-view are in focus, i.e. the perfect wide angle lens has an infinite depth-of-field. The two important postulates of this lens system (refer to FIGS. 12 and 13) are stated as follows:

Postulate 1: Azimuth angle invariability—For object points that lie in a content plane that is perpendicular to the image plane and passes through the image plane origin, all such points are mapped as image points onto the line of intersection between the image plane and the content plane, i.e. along a radial line. The azimuth angle of the image points is therefore invariant to elevation and object distance changes within the content plane.

Postulate 2: Equidistant Projection Rule—The radial distance, r, from the image plane origin along the azimuth angle containing the projection of the object point is linearly proportional to the zenith angle $\beta$, where $\beta$ is defined as the angle between a perpendicular line through the image plane origin and the line from the image plane origin to the object point. Thus the relationship:

$$r = k\beta \qquad (1)$$

Figure 12:
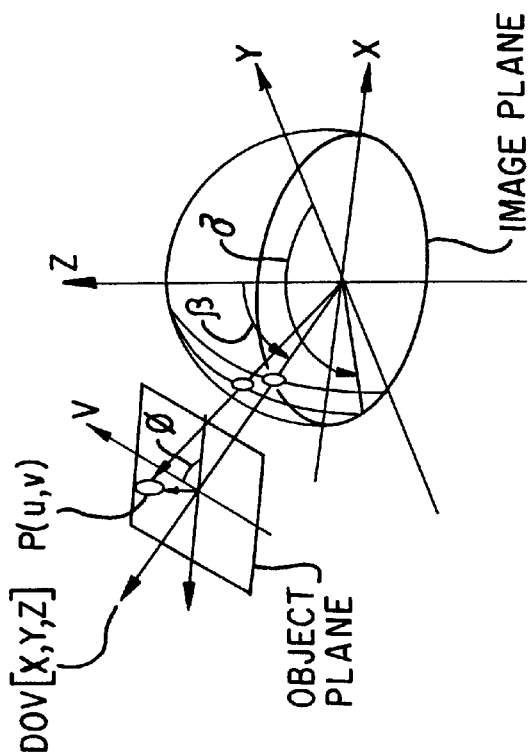
FIG. 12 is a schematic diagram of the fundamental geometry that the present invention embodies to accomplish the image transformation.

Using these properties and postulates as the foundation of the lens system, the mathematical transformation for obtaining a perspective corrected image can be determined. FIG. 12 shows the coordinate reference frames for the object plane and the image plane. The coordinates u,v describe object points within the object plane. The coordinates x,y,z describe points within the image coordinate frame of reference.

The object plane shown in FIG. 12 is a typical region of interest to determine the mapping relationship onto the image plane to properly correct the object. The direction of view vector, DOV[x,y,z], determines the zenith and azimuth angles for mapping the object plane, UV, onto the image plane, XY. The object plane is defined to be perpendicular to the vector, DOV[x,y,z].

The location of the origin of the object plane in terms of the image plane [x,y,z] in spherical coordinates is given by:

$$x = D \sin\beta \cos\partial \qquad (2)$$
$$y = D \sin\beta \cos\partial$$
$$z = D \cos\beta$$

where D=scaler length from the image plane origin to the object plane origin, $\beta$ is the zenith angle, and $\partial$ is the azimuth angle in image plane spherical coordinates. The origin of object plane is represented as a vector using the components given in Equation 1 as:

$$DOV[x,y,z] = [D\sin\beta\cos\partial, D\sin\beta\sin\partial, D\cos\beta] \qquad (3)$$

DOV[x,y,z] is perpendicular to the object plane and its scaler magnitude D provides the distance to the object plane. By aligning the XY plane with the direction of action of DOV[x,y,z], the azimuth angle $\partial$ becomes either 90 or 270 degrees and therefore the x component becomes zero resulting in the DOV[x,y,z] coordinates:

$$DOV[x,y,z] = [0, -D\sin\beta, D\cos\beta] \qquad (4)$$

Figure 13:
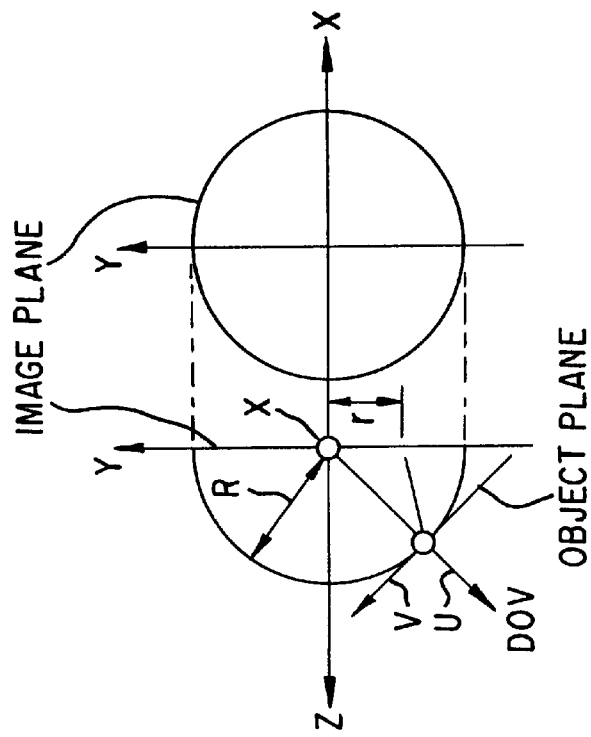
FIG. 13 is a schematic diagram demonstrating the projection of the object plane and position vector into image plane coordinates.

Referring now to FIG. 13, the object point relative to the UV plane origin in coordinates relative to the origin of the image plane is given by the following:

$$x = u$$
$$y = v \cos\beta \qquad (5)$$
$$z = v \sin\beta$$

therefore, the coordinates of a point P(u,v) that lies in the object plane can be represented as a vector P[x,y,z] in image plane coordinates:

$$P[x,y,z]=[u, v\cos\beta, v\sin\beta] \quad (6)$$

where P[x,y,z] describes the position of the object point in image coordinates relative to the origin of the UV plane. The object vector o[x,y,z] that describes the object point in image coordinates is then given by:

$$O[x,y,z]=DOV[x,y,z]+P[x,y,z] \quad (7)$$

$$O[x,y,z]=[u, v\cos\beta-D\sin\beta, v\sin\beta+D\cos\beta] \quad (8)$$

Projection onto a hemisphere of radius R attached to the image plane is determined by scaling the object vector o[x,y,z] to produce a surface vector s[x,y,z]:

$$S[x, y, z] = \frac{RO[x, y, z]}{|O[x, y, z]|} \quad (9)$$

By substituting for the components of o[x,y,z] from Equation 8, the vector S[x,y,z] describing the image point mapping onto the hemisphere becomes:

$$S[x, y, z] = \frac{RO[u, (v\cos\beta - D\sin\beta), (v\sin\beta + D\cos\beta)]}{\sqrt{u^2 + (v\cos\beta - D\sin\beta)^2 + (v\sin\beta + D\cos\beta)^2}} \quad (10)$$

The denominator in Equation 10 represents the length or absolute value of the vector o[x,y,z] and can be simplified through algebraic and trigonometric manipulation to give:

$$S[x, y, z] = \frac{RO[u, (v\cos\beta - D\sin\beta), (v\sin\beta + D\cos\beta)]}{\sqrt{u^2 + v^2 + D^2}} \quad (11)$$

From Equation 11, the mapping onto the two-dimensional image plane can be obtained for both x and y as:

$$x = \frac{Ru}{\sqrt{u^2 + v^2 + D^2}} \quad (12)$$

$$y = \frac{R(v\cos\beta - D\sin\beta)}{\sqrt{u^2 + v^2 + D^2}} \quad (13)$$

Additionally, the image plane center to object plane distance D can be represented in terms of the image circular radius R by the relation:

$$D=mR \quad (14)$$

where m represents the scale factor in radial units R from the image plane origin to the object plane origin. Substituting Equation 14 into Equations 12 and 13 provides a means for obtaining an effective scaling operation or magnification which can be used to provide zoom operation.

$$x = \frac{Ru}{\sqrt{u^2 + v^2 + m^2 R^2}} \quad (15)$$

$$y = \frac{R(v\cos\beta - mR\sin\beta)}{\sqrt{u^2 + v^2 + m^2 R^2}} \quad (16)$$

Using the equations for two-dimensional rotation of axes for both the UV object plane and the XY image plane the last two equations can be further manipulated to provide a more general set of equations that provides for rotation within the image plane and rotation within the object plane.

$$x = \frac{R[uA - vB + mR\sin\beta\sin\partial]}{\sqrt{u^2 + v^2 + m^2 R^2}} \quad (17)$$

$$y = \frac{R[uC - vD + mR\sin\beta\cos\partial]}{\sqrt{u^2 + v^2 + m^2 R^2}} \quad (18)$$

where:

$A=(\cos\phi\cos\partial-\sin\phi\sin\partial\cos\beta)$ $B=(\sin\phi\cos\partial+\cos\phi\sin\partial\cos\beta) \quad (19)$ $C=(\cos\phi\sin\partial+\sin\phi\cos\partial\cos\beta)$ $D=(\sin\phi\sin\partial-\cos\phi\cos\partial\cos\beta)$ and where:
R=radius of the image circle
β=zenith angle
∂=Azimuth angle in image plane
φ=Object plane rotation angle
m=Magnification
u,v=object plane coordinates
x,y=image plane coordinates The Equations 17 and 18 provide a direct mapping from the UV space to the XY image space and are the fundamental mathematical result that supports the functioning of the present omnidirectional viewing system with no moving parts. By knowing the desired zenith, azimuth, and object plane rotation angles and the magnification, the locations of x and y in the imaging array can be determined. This approach provides a means to transform an image from the input video buffer to the output video buffer exactly. Also, the image system is completely symmetrical about the zenith, therefore, the vector assignments and resulting signs of various components can be chosen differently depending on the desired orientation of the object plane with respect to the image plane. In addition, these postulates and mathematical equations can be modified for various lens elements as necessary for the desired field-of-view coverage in a given application.

The input means defines the zenith angle, β, the azimuth angle, ∂, the object rotation, φ, and the magnification, m. These values are substituted into Equations 19 to determine values for substitution into Equations 17 and 18. The image circle radius, R, is fixed value that is determined by the camera lens and element relationship. The variables u and v vary throughout the object plane determining the values for x and y in the image plane coordinates.

From the foregoing, it can be seen that a wide angle lens provides a substantially hemispherical view that is captured by a camera. The image is then transformed into a corrected image at a desired pan, tilt, magnification, rotation, and focus based on the desired view as described by a control input. The image is then output to a television display with the perspective corrected. Accordingly, no mechanical devices are required to attain this extensive analysis and presentation of the view of an environment through 180 degrees of pan, 180 degrees of tilt, 360 degrees of rotation, and various degrees of zoom magnification.

As indicated above, one application for the perspective correction of images obtained with a motionless wide angle camera is in the field of surveillance. The term "surveillance" is meant to include inspection and like operations as well. It is often desired to continuously or periodically view a selected environment to determine activity in that environment. The term "environment" is meant to include such areas as rooms, warehouses, parks and the like. This activity might be, for example, ingress and egress of some object relative to that environment. It might also be some action that is taking place in that environment. It may be desired to carry out this surveillance either automatically at the desired frequency (or continuously), or upon demand by an operator. The size of the environment may require more than one motionless camera for complete surveillance.

While a preferred embodiment has been shown and described, it will be understood that it is not intended to limit the disclosure, but rather it is intended to cover all modifications and alternate methods falling within the spirit and the scope of the invention as defined in the appended claims. All of the above referenced U.S. patents and pending applications referenced herein are expressly incorporated by reference.

Having thus described the aforementioned invention, We claim:

1. A method for capturing a spherical image comprising the steps of capturing a first approximately hemispherical image via a first camera including a first hemispherical lens;

capturing a second approximately hemispherical image via a second camera including a second oppositely directed hemispherical lens, wherein the first and second approximately hemispherical images overlap with each other such that each of the first and second approximately hemispherical images has an overlapping portion with the other of the first and second approximately hemispherical images; and combining said first and second oppositely directed hemispherical images to create a seamless spherical image by averaging the overlapping portions of both the first and second approximately hemispherical images.

2. An apparatus for capturing a spherical image comprising:

a first camera equipped with a first 180° or greater field-of-view lens, said first camera and said first lens directed in a first direction, said first camera capturing a first image;

a second camera with a second 180° or greater field-of-view lens, said second camera and said second lens directed in a second direction opposite said first direction, said first and second cameras arranged in a back-to-back position, said second camera capturing a second image, wherein the first and second images overlap with each other such that each of the first and second images has an overlapping portion with the other of the first and second images; and a combining system for combining said first and second images into a seamless formed image by averaging the overlapping portions of both the first and second images.

3. The method of claim 1, wherein the step of combining includes averaging the overlapping portions of both the first and second approximately hemispherical images using weighted averaging.

4. The method of claim 1, wherein the step of combining includes averaging the overlapping portions of both the first and second images using weighted averaging.

5. The apparatus of claim 2, wherein the combining system is configured to combine the first and second images by averaging the overlapping portions of both the first and second images using weighted averaging.

6. A method for creating a seamless spherical image, the seamless spherical image comprising at least a first image in a first direction and a second image in a second direction different from the first direction, the method comprising the steps of:

combining at least the first and second images to create the seamless spherical image, the first and second images overlapping with each other such that each of the first and second images has an overlapping portion with the other of the first and second images, the step of combining including averaging the overlapping portions of the first and second images; and storing the entire seamless spherical image as a single image.

7. The method of claim 6, further including the steps of:

capturing the first image; and capturing the second image.

8. The method of claim 6, wherein the step of averaging includes averaging the overlapping portions of both the first and second images using weighted averaging.

9. The method of claim 6, wherein the step of storing includes storing the entire seamless spherical image as a single image in a memory.

10. The method of claim 6, wherein the step of combining includes creating a single, complete, and formed seamless spherical image.

11. The method of claim 6, wherein each of the first and second images is an approximately hemispherical image.

12. The method of claim 6, wherein the first image has a field of view greater than 180 degrees.

13. An apparatus for creating a seamless spherical image, the seamless spherical image comprising at least a first image in a first direction and a second image in a second direction different from the first direction, the apparatus comprising:

a processor for combining at least the first and second images to create the seamless spherical image, the first and second images overlapping with each other such that each of the first and second images has an overlapping portion with the other of the first and second images, the processor being configured to combine the first and second images by averaging the overlapping portions of the first and second images; and a storage device for storing the entire seamless spherical image as a single image.

14. The apparatus of claim 13, wherein the processor is further configured to average the overlapping portions using weighted averaging.

15. The apparatus of claim 13, wherein the storage device is a memory.

16. The apparatus of claim 13, wherein the processor is configured to combine the first and second approximately hemispherical images into a single, complete, and formed seamless spherical image.

17. The apparatus of claim 13, wherein each of the first and second images is an approximately hemispherical image.

18. The apparatus of claim 13, wherein the first image has field of view greater than 180 degrees.

* * * * *